(No Model.)
J. N. DICKSON.
VACCINATOR.
No. 257,668. Patented May 9, 1882.
WITNESSES
INVENTOR
John N. Dickson
by W. H. Doolittle
Attorney

UNITED STATES PATENT OFFICE.

JOHN N. DICKSON, OF NEW CASTLE, PENNSYLVANIA.

VACCINATOR.

SPECIFICATION forming part of Letters Patent No. 257,668, dated May 9, 1882.

Application filed February 9, 1882. (No model.)

*To all whom it may concern:*

Be it known that I, JOHN N. DICKSON, a citizen of the United States, residing at New Castle, in the county of Lawrence and State of Pennsylvania, have invented certain new and useful Improvements in Vaccinators; and I do hereby declare the following to be a full, clear, and exact description of the invention, such as will enable others skilled in the art to which it appertains to make and use the same.

The object of my invention is to produce an instrument which, while free from any possible injurious effects in itself, shall be capable of acting at once as a scarifier and carrier of vaccine virus—that is to say, as a complete vaccinator.

Heretofore vaccine virus has been placed upon what are known as "points," which are pieces of ivory or bone suitably pointed and sharpened, and thus adapted to combine the functions of a scarifier with those of an instrument for carrying and applying the virus. On account of the expense of ivory this is not so much used, but bone is substituted. Besides the expense and trouble in preparing points from these materials they are in other respects highly objectionable. Ivory and bone being porous, the points absorb and thus waste much of the vaccine virus applied to them, though this is perhaps of minor importance when compared with the danger which may attend their use arising from another cause. If the refuse carcass of an animal—such as a dog or horse, which generally dies of disease, and from which the bone is usually collected—were the carcass of an animal which had died of some infectious malady, or if the carcass had been allowed to putrefy before the bone or ivory was collected, these substances, and consequently the points made therefrom, will contain loathsome and highly-infectious matter, which may be dissolved and pass into the human system with the vaccine virus and produce the most baleful effects in disgusting and often ineradicable disease.

Vaccine virus has also been placed upon a quill. Quill is preferable to bone or ivory as a scarifier, because the quill is not sufficiently porous to absorb the virus and is not likely to be diseased; but heretofore the quill, so far as I know, has never been adapted for use as a combined scarifier and vaccine carrier and applier.

My invention therefore comprises a combined scarifier and vaccine-carrier consisting of a quill sharpened and bearing the virus.

My improvement is shown in the accompanying drawing, in which A represents a quill with sharpened point *b*, and virus applied thereto, as indicated in shaded lines.

The quill, in order that it may the better be adapted for the purpose of my invention, may first be hardened and clarified by well-known processes.

Having thus described my improvement, what I claim is—

A combined scarifier and vaccine-carrier, consisting of a quill clarified, hardened, and sharpened, and bearing the virus, substantially as described.

In testimony whereof I affix my signature in presence of two witnesses.

JOHN N. DICKSON.

Witnesses:
 G. W. F. SWARTZELL,
 JNO. R. YOUNG.